United States Patent [19]
Hirdes

[11] 3,841,534
[45] Oct. 15, 1974

[54] DISPENSING DEVICE FOR BULK GOODS

[76] Inventor: Rudiger Hirdes, 4630 Bochum, Tippelsberger Str. 42, Bochum, Germany

[22] Filed: July 6, 1973

[21] Appl. No.: 377,130

[30] Foreign Application Priority Data
July 6, 1972 Germany............................ 2233126

[52] U.S. Cl. ............................................... 222/457
[51] Int. Cl. ............................................. G01f 11/34
[58] Field of Search ........ 222/457, 457.5, 437, 438, 222/440, 456

[56] References Cited
UNITED STATES PATENTS
| | | | |
|---|---|---|---|
| 907,291 | 12/1908 | Sanders............................ | 222/456 X |
| 1,276,382 | 8/1918 | Loveland ........................... | 222/437 |
| 1,280,654 | 10/1918 | Bream................................. | 222/456 |
| 1,477,226 | 12/1923 | Meguiar............................. | 222/456 |
| 1,687,705 | 10/1928 | Andrott......................... | 222/456 UX |
| 1,877,808 | 9/1932 | Cagliostro........................... | 222/456 |

FOREIGN PATENTS OR APPLICATIONS
947,430  8/1956  Germany ........................... 222/564

*Primary Examiner*—Stanley H. Tollberg
*Assistant Examiner*—Norman L. Stack, Jr.
*Attorney, Agent, or Firm*—Armstrong, Nikaido & Wegner

[57] ABSTRACT

A dispensing device for a material having fluid properties is provided. The device includes a container and a funnel or trap chamber positioned within the container to form an antechamber. A discharge pipe passes through one wall of the container such that one end of the pipe is within the antechamber. The material passes from the main portion of the container into the antechamber and then out through the discharge pipe. This arrangement permits the container to be completely emptied without clogging.

12 Claims, 3 Drawing Figures

DISPENSING DEVICE FOR BULK GOODS

BACKGROUND OF THE INVENTION

1. Field of the Invention

The present invention relates to a dispensing device for material having fluid properties. This device comprises a container and a discharge pipe passing through the wall of the container. The end of the discharge pipe within the container opens into an antechamber which communicates with the container via leak holes.

2. Description of the Prior Art

A dispensing device of the type having a discharge pipe which crosses practically the entire container and the end of which is rigidly and concentrically connected to the antechamber, is known in the art. In the case of this known device, the outer edge of the antechamber is flush with the edge between the floor and the wall of the container, while the relatively small leak holes are arranged some distance therefrom in the shell of the antechamber. This dispensing device cannot be emptied only to the level of the leak holes in the antechamber and not completely. With each pouring operation, part of the material flows back into the container through the antechamber leak holes. This prevents the accurate regulation of uniform quantities of material. Furthermore, the antechamber leak holes located at the bottom of the container can easily clog or become caked due to the weight of the material, especially if it is hygroscopic. This necessitates the cleaning of the completely or partially filled container.

Another dispensing device known in the art comprises a discharge pipe which is obliquely cut at both ends and projects far into the container. This has the disadvantage that, firstly, the container can never be completely emptied, and secondly, that the quantity of material measured is a function of the level of the material and of the positioning of the sloping end of the discharge pipe with respect to the pouring direction.

Still another dispensing device is known in the art, in which the discharge pipe is arranged with its entire front face resting on the base of the container and a lateral leak hole is provided in the discharge pipe sleeve. Apart from the disadvantage of having the input flow direction arranged at a 90° angle with respect to the axis of the discharge pipe, which is unfavorable as far as inflow is concerned, this device is also incapable of being emptied completely. Furthermore, the regulation of uniform quantities of the material is haphazard and the inflow opening easily clogs up, especially in the case of hygroscopic materials. A further disadvantage of this device is that, after it has been filled, it only closes with difficulty on account of the discharge pipe which has to be pushed through the material.

SUMMARY OF THE INVENTION

The object of the present invention is to obviate the above disadvantages and to provide a device which allows the container to be emptied completely irrespective of the discharging direction while ensuring that the material is discharged in uniform quantities.

According to the invention, this problem is solved in that the end of the discharge pipe is surrounded by a funnel or trap chamber provided with leak holes at the container wall and having its closed tip turned away from the end of the discharge pipe. By means of this arrangement, the funnel is filled up via the largest openings located on its periphery during the first discharging operation so that the material collected in the funnel can be transferred to the discharge pipe in regular quantities during the second discharging operation. This method of operation prevents the material from being compressed by its own weight in the region of the opening in the discharge pipe and further prevents the associated caking at the leak holes which is particularly common when the material is hygroscopic. The complete emptying of the container is also ensured thereby. To ensure that the minimum amount of material collected in the funnel passes back into the container during the charging process, the wall of the container is tapered on the side penetrated by the discharge pipe, thereby advantageously directing the material towards the middle of the container lid. The axially symmetrical funnel is detachably or undetachably secured to the wall of the container by one or more cross-pieces. Its leak holes are arranged a uniform distance apart from each other in a circle around the wall of the container. At its end facing towards the funnel, the discharge pipe is provided with a spacer element to prevent it from being blocked up.

According to another advantageous feature of the invention, to regulate the quantities of material being discharged in a uniform manner, the funnel is provided with a regulating chamber arranged coaxially with the discharge pipe. This regulating chamber is preferably cylindrical in shape and its mouth is smaller than the cross-section of the discharge pipe. The chamber mouth can be reduced in size by an annular diaphragm which is conical on both sides and favorable to the inflow of material.

According to a particularly advantageous feature of the invention, the funnel is in the shape of a buoy and is provided with a cylindrical part which grips the lower part of the discharge pipe. This ensures that all the material below the discharge pipe reaches this pipe. It is advantageous for the annular slot between the discharge pipe and the cylindrical part of the funnel to be sufficiently large to ensure that the regulating chamber fills up, and sufficiently narrow to slow down the flow of material from the funnel even during a slow pouring operation.

Advantageously, the distance between the discharge pipe and the regulating chamber is adjustable thus permitting the desired quantity of material to be regulated externally in advance by the particular user, in a perfectly hygienic manner. The distance between the discharge pipe and the regulating chamber is altered by adjusting or displacing by means of threading the discharge pipe in a collar in the container wall.

After the container has been emptied completely, it is opened at the side penetrated by the discharge pipe and/or at the opposite side thereto. To avoid the compression of the material and the accompanying mechanical stresses on the funnel, it is generally advantageous to insert the material from the bottom of the container and only to unscrew or remove in some other way the container wall provided with the discharge pipe, for cleaning purposes.

Other objects, features and advantages of the present invention will be made apparent from the following detailed description of three embodiments thereof provided with reference to the accompanying drawings, in which:

DESCRIPTION OF THE PREFERRED EMBODIMENTS

Figure 1:
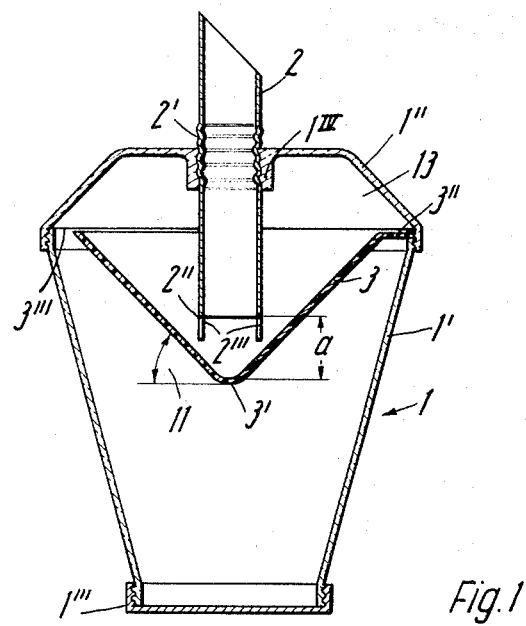
FIG. 1 represents one preferred embodiment having a conical funnel.
Figure 2:
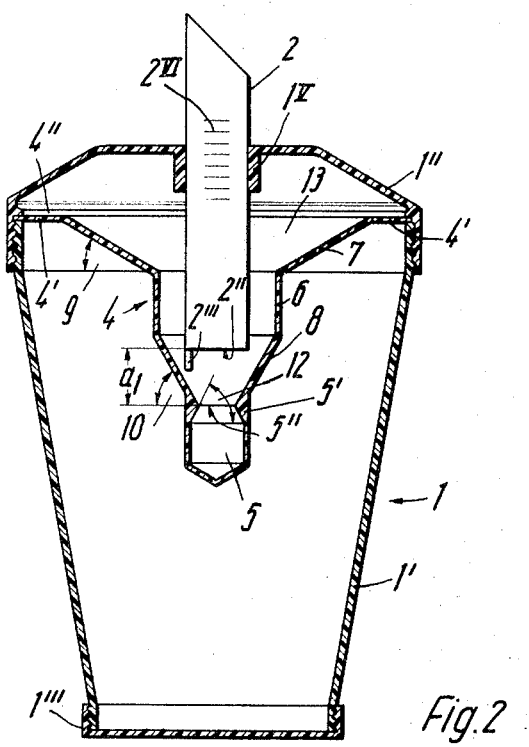
FIG. 2 represents another preferred embodiment with a buoy-shaped funnel.
Figure 3:
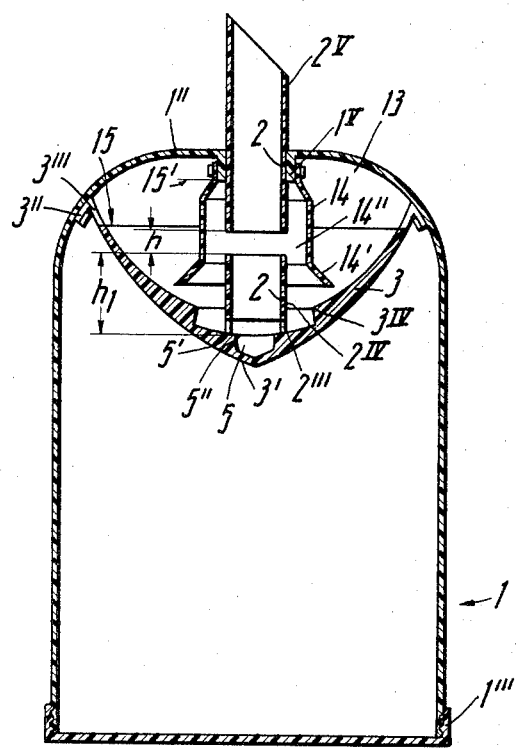
FIG. 3 represents another preferred embodiment with an additional regulating chamber.

The dispensing device represented in the drawings consists essentially of a container 1, the discharge pipe 2 and the funnel or trap chamber, which is a conical shape 3 in FIGS. 1 and 3 and a buoy-shape 4 in FIG. 2.

The container 1 comprises a conical central part 1' closed above by a lid 1'' and below by a trap cap 1'''. The lid 1'' and the trap cap 1''' are preferably secured to the central part 1' by a screw fastening, bayonett union or the like.

In FIG. 1, the lid 1'' is provided with the collar 1$^{IV}$, in which the discharge pipe 2 is designed to be adjustable by means of the thread 2'. In this way, the distance between the lower end 2'' of the discharge pipe 2 and the pointed end 3' of the funnel 3 can be adjusted to the desired quantity of material. The funnel 3 is provided with three narrow cross-pieces 3'' displaced by 120° with respect to each other. In the case in question, these are preferably wedged between the lid 1'' and the central part 1', thereby holding the funnel 3 in a non-displaceable manner. In this way, openings 3''' are provided between the outer periphery of the funnel 3 and the wall of the container. In the present case, these are annular in shape and are only interrupted by the cross-pieces 3''. These cross-pieces are preferably triangular and have one edge facing towards the inside of this container.

In FIG. 2, the collar 1$^r$ abuts in a press-fit manner on the discharge pipe 2 so that in this case, the distance $a_1$ between the lower end 2'' of the discharge pipe 2 and the mouth 5'' of the conical, annular diaphragm 5' of the regulating chamber can be set by slight rotation and pulling or pushing.

Apart from the regulating chamber 5, the buoy-shaped funnel 4 is further provided with a cylindrical part 6 and a conical part 8 arranged thereabove. The angle of inclination 9 of the part 7 and the angle of inclination 10 of the part 8 are dependent on the fluid properties of the material in question in the same way as the angle of inclination 11 of the funnel 3 in FIG. 1, and should be optimally dimensioned. The same applies to the angle of inclination 12 of the conical, diaphragm 5'.

As shown in FIGS. 2 and 3, the mouth 5'' of the conical, annular diaphragm 5' is smaller than the cross-section of the discharge pipe 2, so that when the dispensing device is turned about 180°, the entire amount of material in the regulating chamber 5 moves into the discharge pipe 2.

The buoy-shaped funnel 4 is wedged in a non-displaceable manner between the lid 1'' and the central part 1' by two or more diametrically opposite cross-pieces. Once again annular openings extend on both sides of the cross-pieces 4' along the container wall of the lid 1''.

The dispensing device according to FIG. 3 comprises a discharge pipe 2 which is divided into two parts 2$^{IV}$ and 2$^V$, the lower part 2$^{IV}$ of which is rigidly connected to the funnel 3 and the upper part 2$^V$ of which is adjustable in the collar 1$^V$. If the front sides of the parts 2$^{IV}$ and 2$^V$ are adjacent to each other, only the amount of material which previously passed between the spacers 2'''' into the regulating chamber 5 or the lower part 2$^{IV}$ of the discharge pipe 2 under the effect of the static pressure of the material, will be ejected. As soon as the parts 2$^{IV}$ and 2$^V$ of the discharge pipe are drawn apart, an annular slot of depth h, is produced. Depending on the value h and the distance $h^1$ of the lower part 2$^{IV}$ of the discharge pipe from the regulating chamber 5, the lower part 2$^{IV}$ of the discharge pipe can be charged to a greater or lesser extent on the principle of an overflow pipe.

To make it possible to raise the level 15 of the material around the two parts 2$^{IV}$ and 2$^V$ to the optimum level 15', the discharge pipe 2 is surrounded by a bell-shaped sleeve 14 extended and open at the end 14' facing towards the funnel 3 and closed at its other end. To keep the level of the material in the resulting second regulating chamber 14'' as high as possible by slowing down the outflow of the material, the funnel 3 is provided with a conical annular diaphragm 3$^{IV}$ which co-operates with the extended end 14' of the bell-shaped sleeve 14 in the manner of a cascade.

After inserting the commodity, which is preferably introduced from below by removing the tray cap 1''', the device is rotated about 180° with respect to the position indicated, whereupon the material passes through the annular slots 3''' or 4'' into the charging area 13 between the lid 1'' and the funnel 3 or 4. By rotating the device into the position represented, the material flows to the middle of the funnel 3 or 4 and owing to the tapered shape of the lid 1'' only a small portion of the material slides back into the container through the annular slots 3''' or 4''. If the device is tipped over once again, the premeasured quantity of material passes from the funnel tip 3' or the regulating chamber 5 through the discharge pipe 2 to the exterior of the device.

The funnel 3 or 4 is advantageously made of transparent plastic, for example, a polyacetal, polyacetate or acrylic resin, and the central part 1' of the container 1 is made of either glass or plastic. The lid 1'', the tray cap 1''' and the discharge pipe 2 may be made of chrome-plated or plastic material, depending on the intended application of the device in the hotel trade or the home.

Obviously, certain modifications may be made without departing from the scope of the invention. The funnel 3 or 4 may, for example, be detachably or undetachably secured directly to the lid 1'' or to the central part 1'. This funnel 3 or 4 may also be kept as flat as possible thereby enlarging the effective space to be filled within the container 1 by shortening the discharge pipe 2. It is also possible to provide markings 2$^{vi}$ on the outer surface of the discharge pipe 2 for the accurate regulation of the desired quantity of material.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A dispensing device for bulk goods such device comprising:
   a. a closed container comprising a side wall, a top and a bottom, said top being formed so that the bulk goods flow toward the center thereof;
   b. a first chamber formed within the container for receiving the bulk goods;
   c. flow holes communicating between the first chamber and a second chamber formed by the remainder of the container;
   d. a discharge pipe passing through the top of the container wherein one end of the discharge pipe is in the first chamber and the other end is on the exterior of the container; and,
   e. trap chamber means comprising an open end, a wall and a closed tip wherein at least a portion of the wall is at an acute angle with respect to the axis of the trap chamber means, the trap chamber means forming the first chamber with the top of the container wherein the tip of the trap chamber means is positioned in line with the axis of the discharge pipe and wherein the flow holes are formed between the first and second chambers at the open end of the trap chamber.

2. A dispensing device according to claim 1 wherein the discharge pipe has a spacer element at its end facing toward the trap chamber means.

3. A dispensing device according to claim 1, wherein the trap chamber means is axially symmetrical and is secured to the container wall via one or more crosspieces and the leak holes are formed in the trap chamber means and are spaced a uniform distance apart in the form of a circle around the side wall of the container.

4. A dispensing device according to claim 1 wherein the trap chamber means is in the form of a buoy, the buoy including a lower cylindrical end surrounding the discharge pipe at a distance therefrom.

5. A dispensing device according to claim 1, wherein the discharge pipe is surrounded by a bell-shaped sleeve which is extended and open at its end facing toward the trap chamber means and is closed at its other end.

6. A dispensing device according to claim 1, wherein the container may be opened on the side through which the discharge pipe projects and/or at the opposite side.

7. A dispensing device according to claim 1, wherein the trap chamber is made of a plastic material.

8. A dispensing device according to claim 1 wherein the trap chamber means is provided with a regulating chamber in portion arranged coaxial to the discharge pipe the regulating chamber being cylindrical in shape and its mouth being smaller than the cross section of the discharge pipe.

9. A dispensing device according to claim 8, wherein the mouth of the regulating chamber comprises a diaphragm which is conical.

10. A dispensing device according to claim 1, wherein the distance between the discharge pipe and the trap chamber means is variable.

11. A dispensing device according to claim 10, wherein the position of the discharge pipe is adjustable or displaceable by means of threads on a collar of the container wall.

12. A dispensing device according to claim 11, wherein the discharge pipe is divided into two parts, a lower part which is rigidly connected to the trap chamber means and an upper part which is adjustable in the collar.

* * * * *